United States Patent [19]

Grothe

[11] 4,365,648
[45] Dec. 28, 1982

[54] CHECK VALVE

[76] Inventor: Wolfgang Grothe, Furstenbergstrasse 29, D-7410 Reutlingen, Fed. Rep. of Germany

[21] Appl. No.: 190,396

[22] Filed: Sep. 24, 1980

[30] Foreign Application Priority Data

Oct. 11, 1979 [DE] Fed. Rep. of Germany ....... 2941244

[51] Int. Cl.³ ............................................. F16K 15/04
[52] U.S. Cl. ..................................... 137/539; 137/544
[58] Field of Search ................ 137/539, 539.5, 533.11, 137/544, 545, 549, 550; 210/430

[56] References Cited

U.S. PATENT DOCUMENTS

| 950,533 | 3/1910 | Hilliard | 137/549 X |
| 1,626,721 | 5/1927 | Cohn | 137/549 X |
| 3,827,255 | 8/1974 | Kish | 137/539.5 X |
| 4,014,365 | 3/1977 | Peterson et al. | 210/430 X |
| 4,286,622 | 9/1981 | Ninomiya | 137/539 X |

FOREIGN PATENT DOCUMENTS 987921 4/1951 France .
564206 9/1944 United Kingdom .

Primary Examiner—Robert G. Nilson
Attorney, Agent, or Firm—Shlesinger, Arkwright, Garvey & Dinsmore

[57] ABSTRACT

A check valve having a plastic cylindrical body having an axial inlet and outlet, longitudinal guide ribs on the inside of the body, a spring member urging a valve ball against the inlet opening, a guide pin inside of the spring member, and a screen member covering the inlet opening.

16 Claims, 7 Drawing Figures

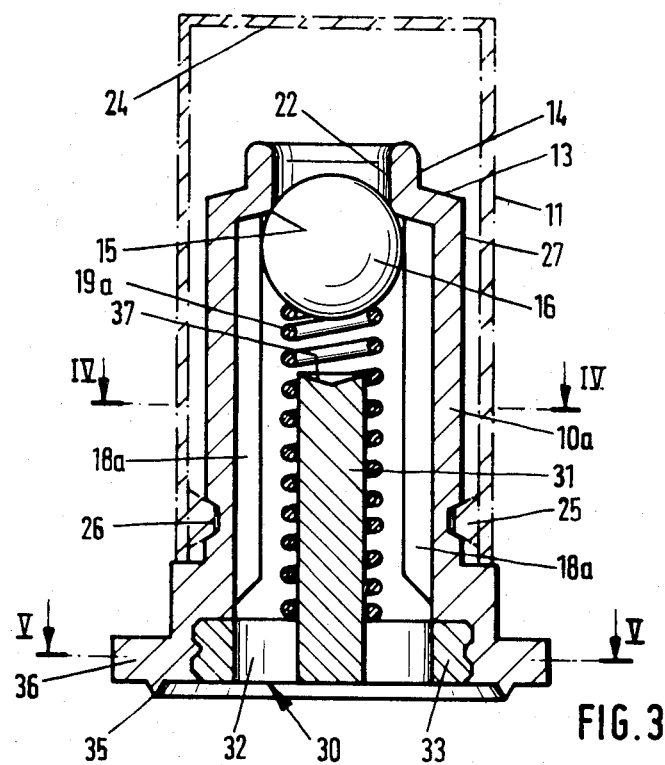
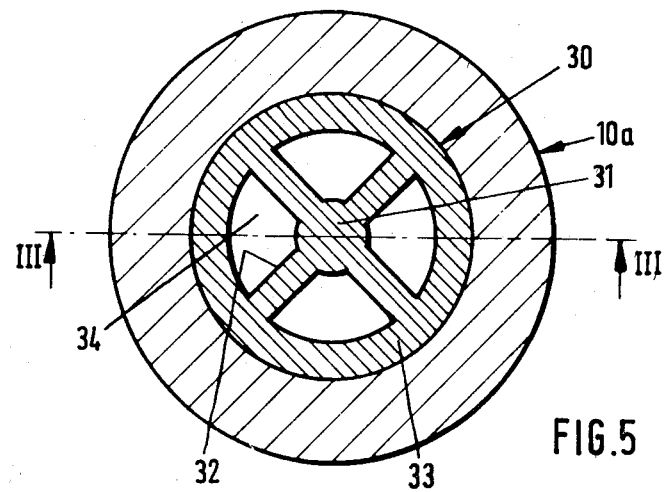
FIG. 3
FIG. 5

CHECK VALVE

This invention relates to a check valve, with a cylindrical or essentially cylindrical plastic housing comprising a liquid inlet and a liquid outlet, a valve ball being forced by a prestressed compression spring against a valve seat inside the housing, the compression spring resting in the rearward direction against a valve bottom joined to the housing, and further comprising a cylindrical screen slipped onto the housing and kept spaced from it radially by lengthwise ribs, the screen covering at least the liquid inlet of the housing.

BACKGROUND AND OBJECTS

Check valves of the kind initially described or similar to it are already on the market in large numbers. In a known check valve of the initially cited kind, the housing is provided with a radial liquid inlet and an axial liquid outlet. The valve ball is forced by a conical compression spring into its valve seat. The valve ball is guided only by the helical compression spring which when the valve is open is compressed into a block by the flow pressure of the liquid passing through the valve. Because the compression spring is forced into a block, free flow through of the liquid through the check valve is hampered, that is, the flow resistance is substantially increased. Furthermore, the valve ball cannot be optimally guided by the compression spring alone.

The known check valve is provided with longitudinal ribs attached to or shaped from the outside surface of its housing, which thereby keep a sleeve-shaped screen slipped onto said housing radially spaced from its outside surface. The sleeve like screen consists of a metal wire and covers the entire housing outside surface, including the radial liquid inlet. Because of the radial liquid inlet and the ensuing deflection of the liquid, a further disadvantageous increase in flow resistance is incurred.

It is the object of the present invention to so design a check valve of the initially discussed type that the flow resistance is reduced to a minimum and that reliable operation of the check valves is ensured by an accurate guidance of the valve ball. Furthermore it is the object of this invention to design the check valve in such a manner that it is simple and economical to assemble and to manufacture.

This problem is essentially solved by the invention in that the valve ball is guided by longitudinal ribs mounted to the inside wall in the inside space of the housing. Appropriately at least three, preferably four guide ribs are arranged mutually uniformly spaced circumferentially.

These guide ribs preferably are made unitary with the housing as plastic injection molded parts and achieve a defect-free guidance of the valve ball, whereby the compression spring need only assume henceforth a purely closing function, while the ball is guided by the ribs instead of the spring.

In a preferred embodiment of the invention, the valve bottom comprises a central guide pin on which is mounted the compression spring, and the free end of the guide pin is used as the back stop for the spring excursion of the valve ball. Thereby block-formation in the spring is advantageously averted, and as a consequence the low flow resistance within the check valve remains preserved.

In order to further reduce the flow resistance, the liquid inlet advantageously admits the liquid from the end side, that is in the axial direction of the check valve. As regards such a check valve with an end or axial liquid inlet, the invention in an advantageous design process that the cylindrical screen comprise a bottom covering the end-side liquid outlet. This essential concept is easily translated into practice if the cylindrical screen together with the end-side screen bottom are made by plastic injection molding methods.

DESCRIPTION OF THE DRAWINGS

Further details and advantages of the invention can be inferred from the illustrative embodiments shown in the drawing and the description below. In the drawing shows:

FIG. 3 is another embodiment of a check valve, in longitudinal section along line III—III of FIG. 5 and viewed in the direction of the arrows, FIG. 5 is a section along line V—V of FIG. 3, and viewed in the direction of the arrows.

DESCRIPTION OF THE INVENTION

Figure 1:
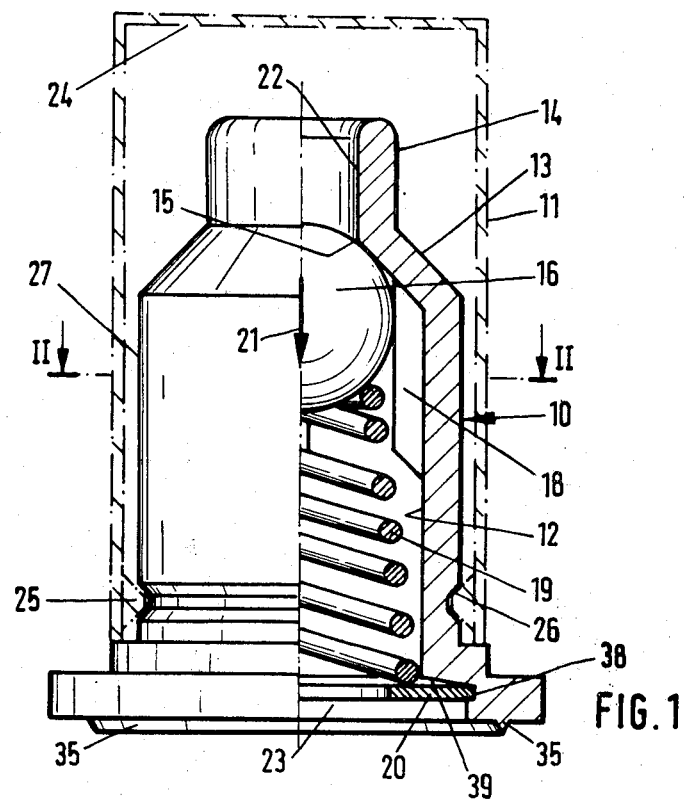
FIG. 1 is a check valve, half in longitudinal section along lines I—I of FIG. 2 and reviewed in the direction of the arrows.
Figure 2:
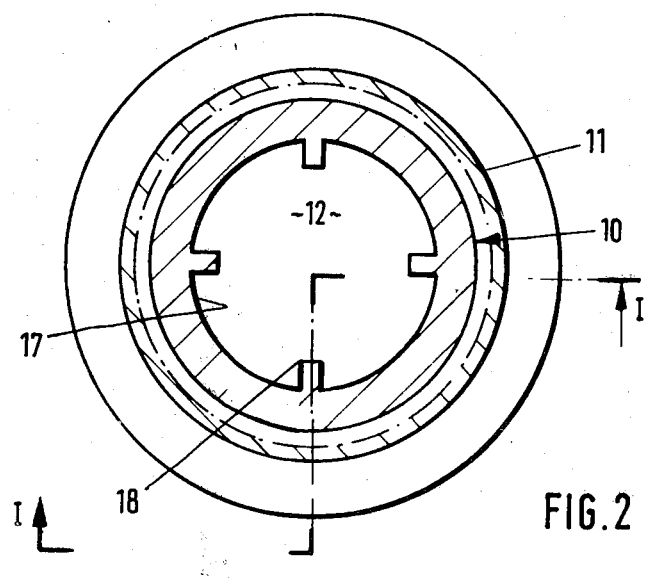
FIG. 2 is a section along lines II—II of FIG. 1 and viewed in the direction of the arrows.

FIGS. 1 and 2 show the housing 19 of a check valve, covered by a screen 11. FIG. 1 shows that the housing wall is uniform in thickness everywhere, thus a simple manufacture of housing 10 using injection molding is possible.

A valve seat is formed at 15 in the inside space 12 of said housing which tapers in its upper region at 13,14. The valve seat cooperates with a valve ball 16.

As shown in particular by FIG. 2, four radially directed and equally spaced longitudinal ribs 18 are attached to or shaped from the inside wall 17 of the housing 10. These ribs guide the valve ball 16.

FIG. 1 further illustrates that the valve ball 16 is pressed by a helical compression spring 19 against the valve seat 15. The valve is closed in that position. The compression spring 19 rests by its lower end against a valve bottom 20 pressed into the housing 10. The housing 10 is provided to that end with an undercut 38 with a chamfer 39, latter facilitating the introduction and indexing of the valve bottom 20 into the undercut 38.

The check valve shown in FIGS. 1 and 2 passes the liquid in the direction of the arrow 21. The liquid intake is at the upper end of the housing 10 at 22. After passing through the valve, the liquid discharges from the housing 10 at 23.

Figure 6:
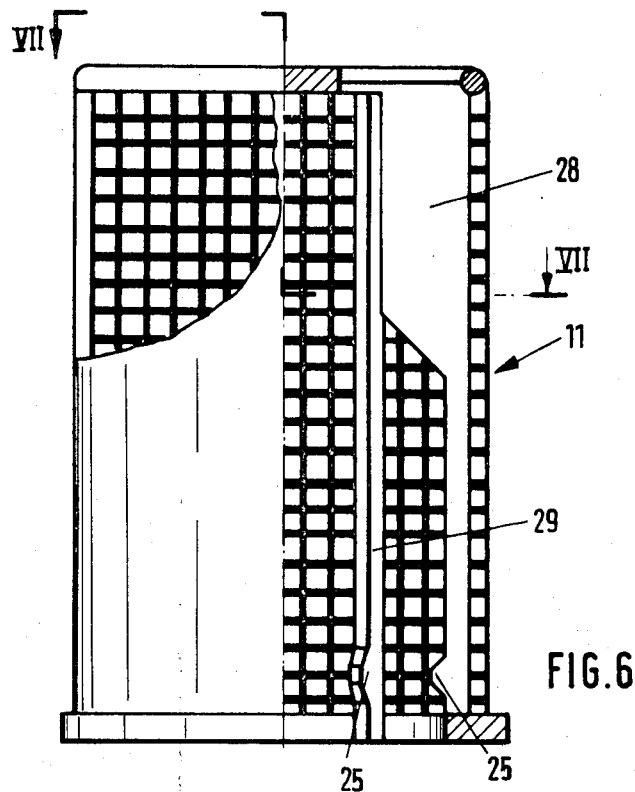
FIG. 6 is a plastic slip-on screen in longitudinal section along line VI—VI of FIG. 7 and viewed in the direction of the arrows.
Figure 7:
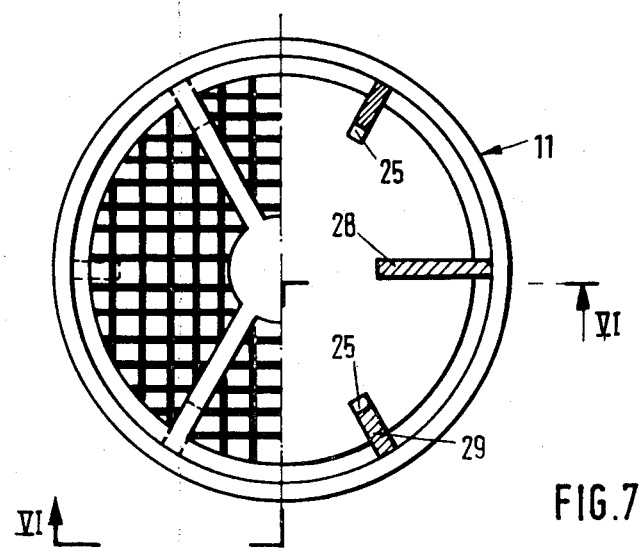
FIG. 7 is a section along VII—VII of FIG. 6 and viewed in the direction of the arrows.

As indicated in FIG 1, the liquid however can arrive at the liquid inlet 22 only after passing through the surrounding screen 11. As made especially clear by FIGS. 6 and 7, the screen 11 is designed as a telescopically mounted slip-on screen and, like the housing 10, is made of plastic. The screen therefore is cylindrical in shape and comprise also a screen top portion 24 covering the liquid intake 22. Together with its portion 24, the screen 11 appropriately is made of injection-molded plastic. Its mesh width is from 0.2 to 0.8 mm, preferably from 0.25 to 0.68 mm. The slip-on screen 11 comprises at its rim an inwardly directed collar 25 which together with a corresponding annular groove 26 in housing 10 forms a snap connection. It is this snap connection which keeps the screen 11 radially spaced from the outside surface 27 of the housing 27. However longitudinal ribs may be additionally provided for that purpose on the inside of the screen, which furthermore also may act as reinforcing means for the screen body. The longitudinal ribs may be arranged along the entire length of the cylindrical part of the housing. They may however also be designed in such a manner that they rest against the upper tapered part of the housing 10 as well. Such a longitudinal rib is shown in FIGS. 6 and 7, where it is referenced by 28. Other longitudinal ribs 29 also shown in FIGS. 6 and 7 rest only against the cylindrical part 27 of the housing 10. In the embodiment shown in FIGS. 6 and 7, the particularity should be noted of the parts 25 of the snap connection 25,26 associated with the screen body 11 being directly attached to the longitudinal ribs 28 and 29 resp.

The outside tapering 13,14 at the inlet side 22 of the valve housing 10 also serves to reduce the flow resistance between the slip-on screen 11 and the outside wall 13,14,27 of the housing 10.

Figure 4:
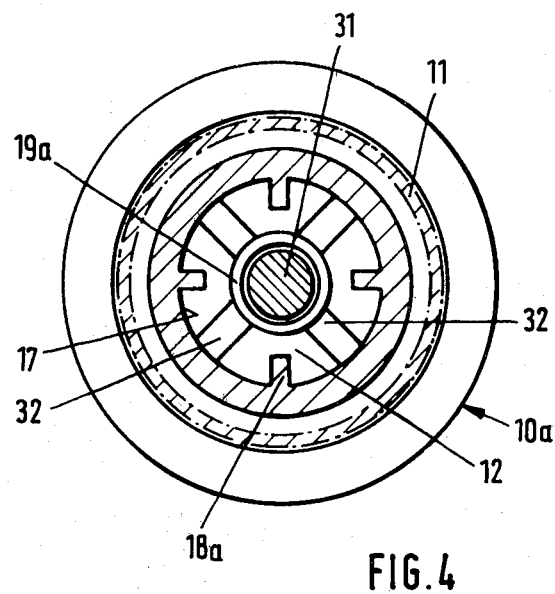
FIG. 4 is a section along line IV—IV of FIG. 3, and viewed in the direction of the arrows.

FIGS. 3 through 5 show another and very advantageous design of a check valve of the invention. For the sake of clarity and perspective, the parts in FIGS. 3 through 5 corresponding to those in FIGS. 1 and 2 are referenced with the same numerals.

As especially indicated in FIG. 3, the embodiment of FIGS. 3 through 5 is characterized essentially in that the valve bottom here referenced as a whole by 30 comprises a central guide pin 31 on which is mounted, or guided, the compression spring 19a which acts on the valve ball 16. As shown by FIG. 5, the central guide pin 31 is connected by four braces or ribs 32 arranged crosswise with the annular part 33 of the valve bottom 30 anchored in the housing 10a. The spaces 34 extending between the ribs 32, i.e. between the central pin means 31 and the ring means 33 serve as liquid outlets in this case. Appropriately the entire valve bottom 30 including the central pin 31 and the cross-like ribs or braces 32 are manufactured integrally by the plastic injection molding method.

As further shown by FIG. 3, the central guide pin 31 at its upper free end comprises a recession 37 acting as the back stop for the spring biased travel of the valve ball 16. Thereby a so-called block-formation of the compression spring 19a is advantageously averted, with beneficial effects regarding a low flow resistance within the check valve.

A further essential characteristic of the embodiment of FIGS. 3 through 5 is that the longitudinal ribs denoted here by 18a extend nearly across the entire length of the inside space of the housing 10a. Accordingly the longitudinal ribs 18a are capable in addition to guiding the valve ball 16 also to ensure a better liquid flow stability within the check valve (the so-called jet directing function).

Another characteristic worthy of notice in the check valve of the invention and common to the embodiments of FIGS. 1 and 2 on one hand and those of FIGS. 3 through 5 on the other, is a sealing lip 35 which encloses the liquid outlet 23 or 32 and attached to or shaped from a lower flange 36 of housing 10 or 10a.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What I claim is:

1. A check valve housing having a cylindrical or essentially cylindrical plastic housing comprising an axial liquid inlet at one end thereof and a liquid outlet, a valve ball urged against a valve seat by a prestressed compression spring within said housing, said compression spring resting against a valve bottom connected to said housing, a cylindrical slip on screen telescopically mounted on the said housing and radially spaced from said housing by means of longitudinal ribs, said screen covering at least said liquid inlet of said housing, said valve ball (16) being guided within the inside (12) of said housing (10a) by longitudinal guide ribs (18a) arranged at the inside wall (17) of said housing.

2. A check valve as in claim 1, characterized in that at least three of said guide ribs (18a) are arranged at mutual uniform circumferential spacings at the inside wall (17) of the housing (10a).

3. A check valve as in claim 2, characterized in that said guide ribs (18a) extend along substantially the entire length of the inside of said housing.

4. A check valve as in claim 2 or 3, characterized in that said housing (10a) is formed integrally with said guide ribs (18a) as a plastic injection molded part and comprises a uniform or essentially uniform wall thickness.

5. A check valve as in claim 4, characterized in that the base of said valve (30) comprises a central guide pin (31) around which is arranged said compression spring (19a), and in that the free end (37) of the guide pin (31) acts as a limit means for the travel of the valve ball (16).

6. A check valve per claim 5, characterized in that said central guide pin (30) is connected by cross-wise arranged braces (32) with an annular rim (33) of the valve base (30) in such a manner that the spaces (34) between the cross-wise braces (32) form a symmetrical liquid outlet (FIGS. 3 through 5).

7. A check valve as in claim 6, characterized in that the valve bottom (30) together with the central guide pin (31) comprise an integral plastic injection-molded part.

8. A check valve as in claim 4, characterized in that the valve base (30) is pressed into an undercut (38) having a chamfer (39) in the housing (10) (FIG. 1).

9. A check valve as in claim 4, characterized in that the slip-on screen (11) is a plastic injection-molded part.

10. A check valve as in claim 9, characterized in that the plastic slip-on screen (11) has a mesh width of 0.2–0.8 mm.

11. A check valve as in claim 10, characterized in that the cylindrical plastic slip-on screen (11) comprises longitudinal ribs (28,29) shaped from the inside for the purpose of reinforcing the screen body and for radial bracing with respect to the outside housing surface (27) (FIGS. 6, 7).

12. A check valve as in claim 11, characterized in that at least some of said inside longitudinal ribs (28,29) extend along the entire length of the screen body (11).

13. A check valve as in claim 12, characterized in that the inside longitudinal ribs (28) of the plastic slip-on screen (11) rest against the housing (10a) over its entire length.

14. A check valve as in claim 9, characterized in that the cylindrical plastic slip-on screen (11) comprise flanges (25) at its rim which cooperate with a corresponding annular groove (26) in the outer surface of the housing (10a) in the manner of a snap-connector.

15. A check valve as in claim 9, characterized in that the housing (10a) is narrower on the liquid inlet side (at 13,14) that the diameter of the plastic slip-on screen (11).

16. A check valve as in claim 9, characterized in that a sealing lip (35) is integral with the liquid outlet.

* * * * *